M. F. WALKER.
FILM END FASTENER FOR MOTION PICTURE FILM REELS.
APPLICATION FILED SEPT. 25, 1918.
1,328,408.
Patented Jan. 20, 1920.
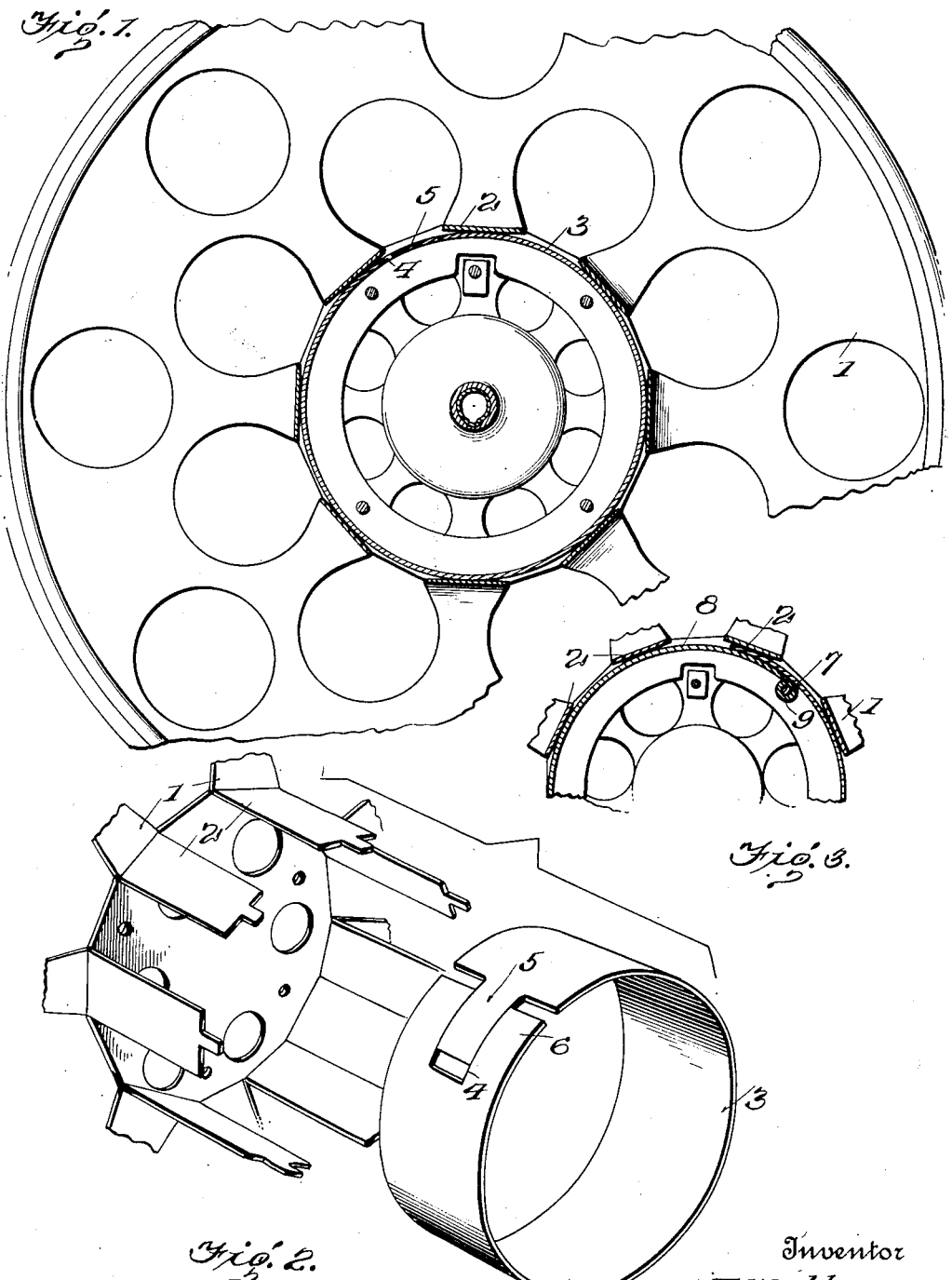
Inventor
M. F. Walker.
By
Lacey & Lacey Attorneys

UNITED STATES PATENT OFFICE.

MOSES F. WALKER, OF CADIZ, OHIO.

FILM-END FASTENER FOR MOTION-PICTURE-FILM REELS.

1,328,408.     Specification of Letters Patent.     Patented Jan. 20, 1920.

Continuation of application Serial No. 222,436, filed March 14, 1918. This application filed September 25, 1918. Serial No. 255,717.

*To all whom it may concern:*

Be it known that I, MOSES F. WALKER, a citizen of the United States, residing at Cadiz, in the county of Harrison and State of Ohio, have invented certain new and useful Improvements in Film-End Fasteners for Motion-Picture-Film Reels, of which the following is a specification.

This invention relates to motion picture film reels and more particularly to the means provided for connecting the end of the film to the hub of the reel.

The primary object of the present invention is to provide means for the purpose above stated which will permit of the end of the film strip being readily and securely connected with the hub of the reel and yet in a manner to permit of its ready disengagement after the film has been completely unwound from the reel.

Another object of the invention is to provide a connecting device for the purpose stated which will adapt the film to be connected with the hub of the reel without the necessity of providing any connecting elements upon the film and without likelihood of mutilating the film end.

This application is a continuation of my co-pending application filed March 14, 1918, Serial No. 222,436.

In the accompanying drawings:

Figure 1 is a vertical sectional view through a film reel embodying the connecting device forming the subject matter of the invention;

Fig. 2 is a perspective view illustrating the hub of the reel and the means provided within the hub for gripping the end of the film to be wound upon the reel;

Fig. 3 is a view similar to Fig. 1 illustrating a modification of the invention.

The heads of the film reel are indicated in general by the numeral 1 and the hub of the reel comprises a series of web portions 2 which extend between the heads of the reel and are arranged in an annular series and relatively spaced apart. These web portions 2 serve to connect the heads of the reel and to form the body of the hub and they also serve a further purpose which will be presently explained.

The web portions 2 are preferably flat as clearly shown in Figs. 1 and 3 of the drawings, and as they are relatively spaced, the end of a film to be wound upon the reel may be readily inserted between any two of the said web portions. In order that when the end of the film is so inserted it may be gripped and connected securely with the hub, means is provided within the hub or, in other words, within the annular series of web portions 2, for frictionally binding the end of the film against the inner side of any one of the web portions 2 beneath which the end of the film is inserted. The means above referred to is, in both forms of the invention, in the nature of a contracted resilient body having a normal tendency to expand. In that form of the invention shown in Figs. 1 and 2 of the drawings, the body, indicated in general by the numeral 3, is in the nature of a relatively broad leaf spring having a normal tendency to flatten out, but coiled to circular form and fitted within the hub so as to be surrounded by the series of web portions 2, against the inner sides of which the body is caused to firmly bear because of its inherent expansibility. In this form of the invention one end of the body is recessed as at 4 and the other end of the body is reduced in width by cutting away its opposite edge portions to provide a tongue 5 which fits within the recess 4 or, in other words, between the tongues 6 which are provided by forming the said recess 4. By reason of this construction, the body 3 may be contracted and expanded, but there will be no gap between its ends and consequently all portions of the body are effective for gripping the film when the end of the film is inserted between the body and any one of the web portions 2.

In that form of the invention shown in Fig. 3 of the drawings, a bolt 7 is fitted through the head of the reel within the hub, and one end of a relatively broad coil leaf spring 8 is bent to provide a sleeve portion 9 fitting the said bolt 7, the spring being bowed to substantially circular form within the hub and with its free end overlapping its end which is connected with the said bolt 7, as shown in the said figure. As in the previously described form of the invention, the spring 8 in this form has a normal tendency to expand and consequently bears firmly against the inner sides of all of the web portions 2 and will grip the end of a film inserted between it and any of the said web portions.

It will be understood, of course, that the hub might be formed solid or integral throughout and provided with one or more slots to receive the end of the film, the spaces between the web portions 2 constituting in effect slots to receive the film end.

Having thus described the invention, what is claimed as new is:

1. The combination with a film reel having a hollow hub provided with a relatively wide transverse opening, of a leaf spring forming substantially a continuation of the hub surface to support the film and expanded within the hub and bearing against the inner side thereof, and constituting means for binding the end of a film strip inserted through said opening.

2. A film reel having a hollow hub provided in its wall with a plurality of transverse slots, and a leaf spring expanded within the hub and bearing against the inner side thereof and constituting means for binding the end of a film strip inserted through any one of said slots, the ends of the spring having interfitting portions.

3. A film reel having side members connected by webs forming a hub, an annular leaf spring expanded within said hub against the inner sides of said webs whereby a film end may be inserted beneath any web and frictionally held by the engagement of said spring therewith, said webs being widely spaced apart permitting easy insertion of the film and allowing the film to naturally follow the configuration of the hub avoiding sharp crimps tending to mutilate the film end.

4. As an article of manufacture, a reel comprising a side portion having webs struck up at right angles thereto and inclosing an annular leaf spring expanded against the inner sides of said webs to form a fastening means, and an opposite side secured to said webs to inclose said spring and complete the reel.

5. In a reel, a hub having widely spaced members inclosing an annular leaf spring bearing against the underside of each web to form a friction clutch for material inserted between any web and said springs, said spring having a transverse tongue and groove division permitting expansion while presenting a substantially continuous support for articles passing thereover.

In testimony whereof I affix my signature.

MOSES F. WALKER. [L. S.]